United States Patent [19]

Usui et al.

[11] Patent Number: 4,931,616
[45] Date of Patent: Jun. 5, 1990

[54] METHOD FOR REMOVING INSULATING COATING OF ELECTRIC CABLE AND APPARATUS THEREFOR

[75] Inventors: Akaru Usui; Hiroshi Tsukahara, both of Aichi, Japan

[73] Assignee: Mitsubishi Denki Kabushiki Kaisha, Tokyo, Japan

[21] Appl. No.: 296,106

[22] Filed: Jan. 12, 1989

[30] Foreign Application Priority Data

Jan. 25, 1988 [JP] Japan .................................. 63-14101
Aug. 5, 1988 [JP] Japan ................................. 63-195659

[51] Int. Cl.⁵ .............................................. B23K 26/00
[52] U.S. Cl. ......................... 219/121.68; 219/121.69; 219/121.77
[58] Field of Search ...................... 219/121.69, 121.68, 219/121.75, 121.76, 121.77

[56] References Cited

U.S. PATENT DOCUMENTS 4,328,410  5/1982  Slivinsky et al. .......... 219/121.68 X
4,427,872  1/1984  Saunders ..................... 219/121.69 X
4,761,535  8/1988  Lawson .......................... 219/121.68

OTHER PUBLICATIONS

M. A. Grimm, IBM Technical Disclosure Bulletin, "Optical System for Laser Machining of Narrow Slots", vol. 14, No. 9, Feb. 1972, pp. 2641–2642.

Wm. Iceland, Insulation/Circuits, "Laser Wire Stripping: Equipment and Operation Notes", Apr., 1980, pp. 47–50.

*Primary Examiner*—C. L. Albritton
*Attorney, Agent, or Firm*—Sughrue, Mion, Zinn, Macpeak & Seas

[57] ABSTRACT

An insulating coating of a desired portion of an electric cable is removed by selectively irradiating the desired portion with a pulse laser beam having a pulse width of 5μ sec or less and a peak output of 1 MW or more.

19 Claims, 4 Drawing Sheets

FIG. 1
FIG. 4
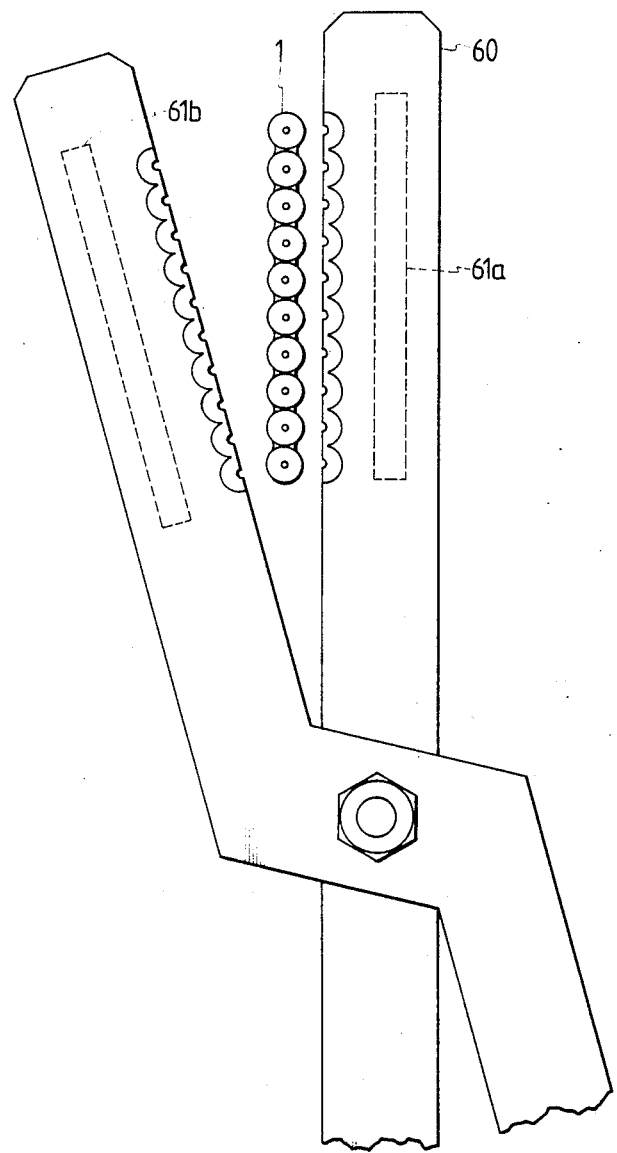
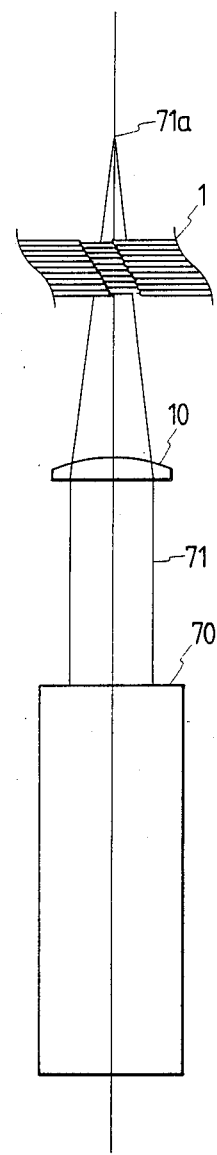

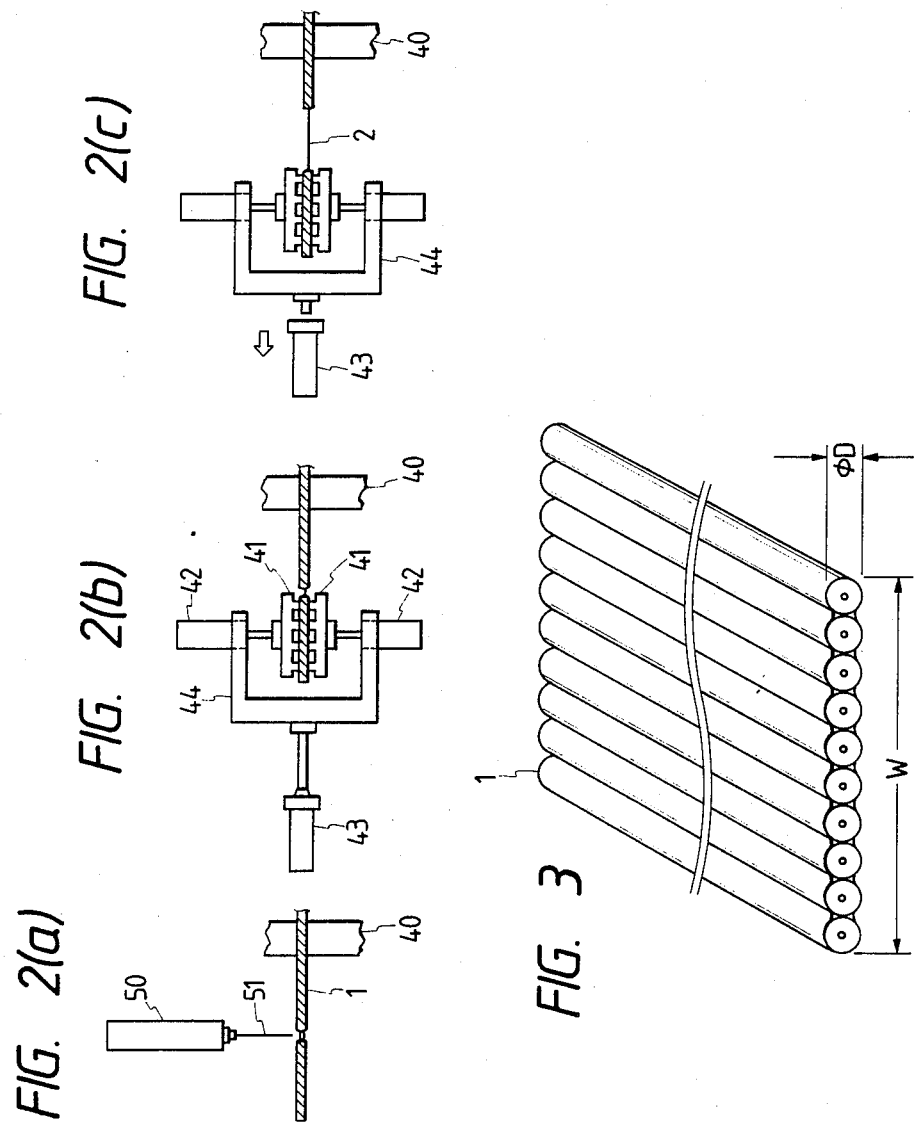

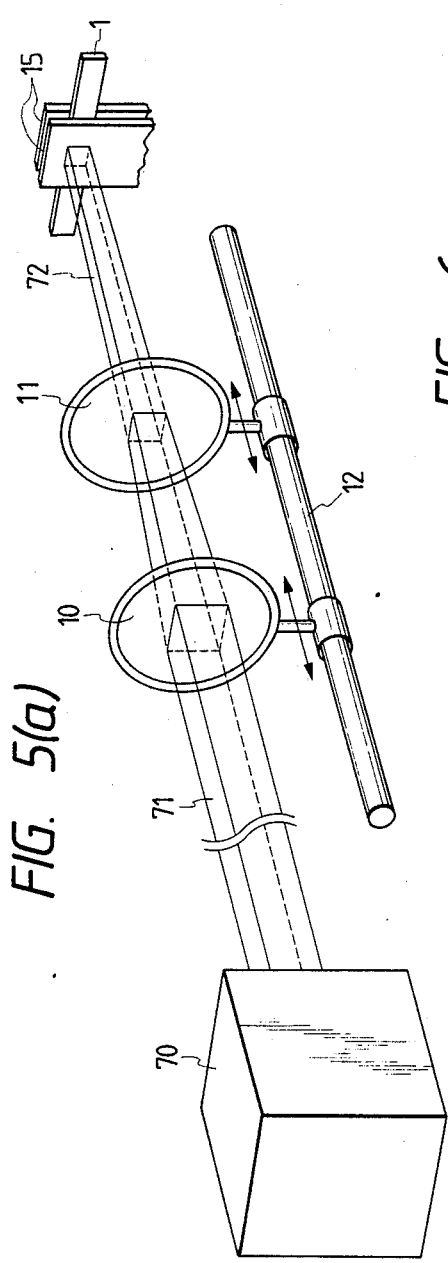
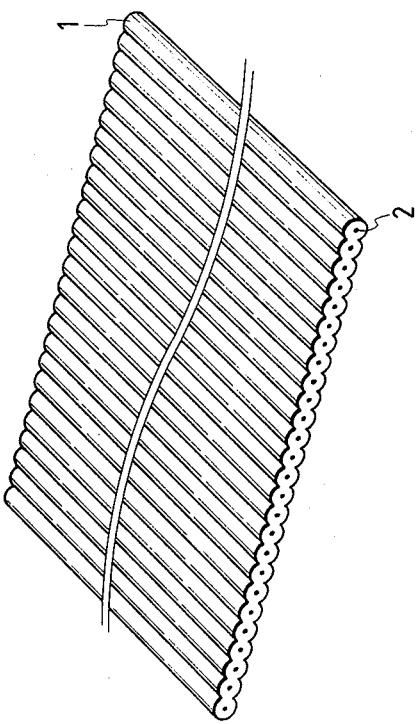
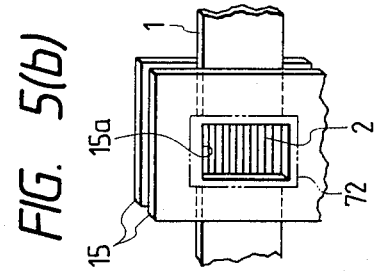

ethod for Removing Insulating Coating of Electric Cable and Apparatus Therefor

BACKGROUND OF THE INVENTION

The present invention relates to a method of, and apparatus for, removing an insulating coating of a relatively thin electric wire such as a vinyl-coated electric wire, by means of a laser beam without damaging a conductor thereof.

A variety of flat cables have been used popularly nowadays as signal cables for computers, office automation equipment, communication devices or video equipment etc. These flat cables used in these areas usually have a pitch of 1–2 mm, a conductor diameter of about 1 mm, and the number of core wires is between 10 to 60, or more.

Each core wire is made from about seven twisted filaments each having a diameter of one hundred and several tens of microns, usually.

Connection between a flat cable and a conductor is made in various manners.

A typical example is the pin-caulking, in which a specially designed jig is used to connect a flat cable to a predetermined connector. Alternatively, it is possible to remove the coating easily by means of a stripping tool.

Besides, the recent tendency of lighter, thinner, shorter, and smaller products forces electronic parts to be miniaturized and lighter, and the size of printed circuit board is also being made smaller, and still making an improvement of its performance into consideration. On the contrary, the size of flat signal cables connecting printed circuit boards is still not made smaller. An area which is occupied by the connector on the printer circuit board is relatively large and since a gap between stacked printed circuit boards becomes smaller, the flexibility thereof should be higher.

An example of a flat cable which may satisfy the above mentioned requirements comprises 30 thin conductors each composed of seven twisted filaments each having a diameter of 20 microns. The flat cable has a thickness of 500 microns and a width of 15 mm. The flexibility of this cable is superior.

An insulating coating of a conventional flat cable can be removed easily by means of a mechanical stripper since an area of each conductor is as large as about 0.3 mm$^2$. Further, the pin caulking can be employed therefor with a specially designed jig.

However, for the flat cable as mentioned above whose conductors are very thin, it is almost impossible to use a mechanical stripper for insulating coating removal and the pin caulking can not be applied thereto. In order to avoid this difficulty, a wire stripper 60 as shown in FIG. 1 may be designed, which is a combination of a conventional mechanical stripper and heaters 61a and 61b. In FIG. 1, reference numeral 1 depicts a flat cable.

Since the conductors of such a flat cable are very thin, it is very difficult to bring the edges of the stripper very close to the conductors. Even if this is done, there may be a problem of damage to the conductors since it is necessary to peel the insulating coating off therefrom.

A method of removing an insulating coating of a flat cable by means of a laser beam has been developed to solve these problems.

An example of a conventional apparatus realizing this method is disclosed in Japanese Patent Application Laid-Open No. 25509/1984, which is illustrated FIG. 2 in which shows an electrical wire 1 coated with an insulating material, conductors 2, a fixing jig 40 for clamping the wire 1, a wire clamper 41, a cylinder 42 for driving the clamper 41, a cylinder 43 for driving a fixing jig 44 for fixing the clamper 41, a laser beam generator 50 and a laser beam 51. In operation, the wire 1 is fixed in a predetermined position by the fixing jig 40, and subjected to the laser beam 51 from the laser beam generator 50. The insulating coating of the wire 1 thereby is therefore melted down as shown in FIG. 2a. Thereafter, the wire 1 is transported by the wire fixing jig 40 to a predetermined position in which the clamper 41 is located. In this position, the clamper 41 clamps the wire 1 under a predetermined pressure by the cylinder 42 as shown in FIG. 2b. Then, the clamper fixing jig 44 is moved in a direction, depicted by an arrow in FIG. 2c, by the cylinder 43, so that the insulating coating of the wire 1 is removed, and the conductors 2 are exposed.

In this prior art, there is a problem of cutting the conductors 2 since the wire is irradiated by the laser beams almost without control. Particularly, for a thin flat cable, this problem becomes serious as it is very difficult to control laser beam energy precisely.

Further, in order to form an exposed region of conductors of predetermined size, it is necessary to pull the wire 1 after laser beam irradiation while being clamped by the clamper, and, hence, this requires a mechanism therefor. Further, when the wire 1 is thin, the conductors thereof may be elongated thereby or, in some cases, may be cut.

SUMMARY OF THE INVENTION

An object of the present invention is to provide an apparatus for, and a non-contact method of, removing an insulating coating of a wire with high accuracy.

Another object of the present invention is to provide an apparatus for removing an insulating coating of a wire, which is capable of forming an exposed region of predetermined size in any portion of the wire without pulling the wire after laser beam irradiation.

According to the present invention, these objects are achieved by utilization of a pulsed laser beam having a small pulse width and a large peak output.

An apparatus according to the present invention comprises a laser oscillator capable of producing a pulsed laser beam having a narrow pulse width and a large peak output, and a cylindrical lens for guiding the pulsed laser beam from the laser oscillator to the insulated wire.

According to another aspect of the present invention, the laser beam has a rectangular waveform and a wire positioning means, having a window analogues in shape to a region of the wire which is to be exposed, is provided in a laser beam irradiating portion of the wire.

BRIEF DESCRIPTION OF THE DRAWINGS

FIG. 1 shows a conventional mechanical stripper for removing an insulating coating of a flat cable;

FIGS. 2a–2c show a conventional system of removing a insulating coating by means of a laser beam, schematically;

FIG. 3 is an oblique view of an example of a flat cable having a portion of a coating which is to be removed by the present invention;

FIG. 4 shows a whole system of an embodiment of the present invention;

FIGS. 5a-5b show a basic construction of another embodiment of the present invention;

FIG. 6 is an oblique view of a flat cable with an insulating coating which is to be removed;

DETAILED DESCRIPTION OF THE PREFERRED EMBODIMENTS

Figures 7A, 7B:
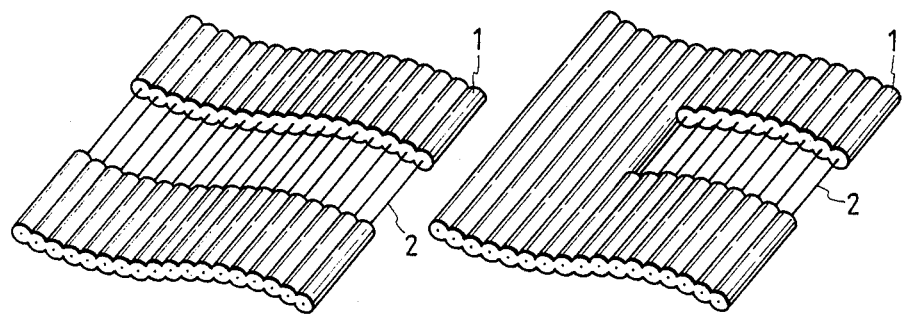
FIGS. 7a and 7b are oblique views of a flat cable with an insulating coating which is removed according to the present invention.

An example of a flat cable 1 to be machined by the present invention is shown in FIG. 3. A thickness ($\Phi$D) of the cable 1 is 0.5 mm and a width (W) is 15 mm. The number of conductors is 30.

FIG. 4 shows an embodiment of the present invention in which a reference numeral 70 depicts a pulse laser oscillator, such as a Transversely Excited Atmospheric Pressure-$CO_2$ laser oscillator (referred to as TEA$CO_2$ laser oscillator, hereinafter), capable of producing a pulse laser beam 71 having a narrow pulse width and a high peak output. A cylindrical lens 10 is disposed on an optical axis to condense a laser beam 71 from the oscillator 70 to a focal point 71a.

As is well known, the TEA$CO_2$ laser oscillator 70 is capable of producing a laser beam having a pulse width of about 2 $\mu$ seconds, a peak output of 15 MW or higher, and a repetition rate of 20 pulses/second.

The flat cable 1 is disposed between the focal point 71a and the cylindrical lens 10. If the flat cable were disposed in a position far from the focal point, laser energy could be consumed for insulation breakdown of air around the focal point.

The following four tests were conducted: (1) removal test; of vinyl coating of the flat cable; (2) soldering test, (3) breakdown voltage test and (4) machining accuracy test.

As to test (1), laser beams of 56 J/cm$^2$, 70 J/cm$^2$, 84 J/cm$^2$, 112 J/cm$^2$ and 140 J/cm$^2$ were used. It has been found that the removal of the coating is possible when the laser energy is 84 J/cm$^2$ or higher.

As to test (2), the soldering is satisfactory when flux is used. In test (3), it has been found that the breakdown voltage is infinitive as in the mechanical machining. Further, as to test (4), the machining accuracy was as high as 3$\pm$0.2 mm since it is possible to direct laser beams optically.

The $CO_2$ pulse laser which is generally used for cutting iron, copper, or aluminum plate is capable of producing a pulse beam having a pulse width as long as several hundred seconds which is enough to cut the vinyl coating as well as a copper conductor even if its peak output small. Therefore, a desired machining is difficult without using a laser such as a TEA$CO_2$ laser or a YAG laser which produce a pulse beam whose pulse width is shorter than that of the above mentioned $CO_2$ pulse laser. Comparing the TEA$CO_2$ laser with the YAG laser, the TEA$CO_2$ laser is preferrable since a laser output of the YAG laser is absorbed more by copper.

With the TEA$CO_2$ laser, following advantages are evident.

(a) Due to the short pulse width, heat transmission may be negligible, so that it is possible to remove a coating on a minute portion of a cable.

(b) Since wavelength of the laser is 10.6 $\mu$m which belongs to far-infrared light, absorption of laser energy by the copper, which is generally used as a core conductor of a cable, is negligible.

(c) Due to a large peak output, transition of coating material from solid phase through liquid phase to gas phase occurs within a very short time.

(d) When irradiation of the coating with a laser beam is performed in a deoxidized atmosphere, there is no oxidation of the core conductor.

It has been found that, when a laser beam having a pulse width of 5 $\mu$sec, a peak output of 1 MW a and a wavelength of 10.6 $\mu$m is used to remove a vinyl coating, the condition of a core conductor whose coating is removed is excellent.

Returning to FIG. 4, pulse laser beam 71 is condensed by a usual lens to a spot. If this spot is in an upstream area of the cable 1, the laser beam cannot be used to remove the coating since insulation breakdown of air occurs around the spot, resulting in air plasma which absorbs laser energy. Therefore, in this embodiment, the cylindrical lens 10 is used since such a lens focuses laser beam not to a spot, but to a energy density line which is much smaller than that of the spot and which allows a more stable coating removal operation.

As described above, according to the present invention, it is possible remove a coating on a thin conductor precisely without exerting undesired force to the conductor.

FIG. 5a shows another embodiment of the present invention. In FIG. 5a, in which the same reference numerals as those used in FIG. 4 depict the same or corresponding elements, respectively, a second cylindrical lens 11 is disposed between a first cylindrical lens 10 and a flat cable 1, and a position adjusting means 12 is provided for adjusting positions of the cylindrical lenses 10 and 11 on an optical axis of a pulse laser 71 from a pulse laser oscillator 70 which is preferably a TEA$CO_2$ laser oscillator. A clamper 15 is further provided for positioning the flat cable 1, which has a window 15a, as shown in FIG. 5b, which shows the clamper 15 in more detail. The flat cable 1 in this embodiment is composed of 20 or more parallel-arranged wires each having a diameter of about 0.5 mm or less, and a core conductor 2 having a diameter of about 120 $\mu$m or less as shown in FIG. 6.

The insulation removal of such a flat cable is performed in various manners according to the demand in connecting it to a desired circuit device. FIG. 7a shows a case where coatings of all of the wires in a selected portion of the flat cable are removed partially throughout a width thereof, and FIG. 7b shows a case where coatings of some of the wires in a selected region are removed partially widthwise.

In order to realize such preferential removal of the coatings of the wires constituting the flat cable, the laser beam 71 omitted from the laser oscillator 70 is condensed by the cylindrical lenses 10 and 11 into a laser beam 72 having a rectangular cross-section. That is, the laser beam 71 is collimated in horizontal and vertical directions in cross section by the cylindrical lenses 10 and 11, separately. This is performed by displacing lenses 10 and 11 along the optical axis by means of the position regulating means 12 so that the beam 72 has a contour, at a position of the flat cable 1, corresponding to a selected region of the flat cable 1.

In operation, as shown in FIG. 5b, the flat cable 1 is pinched by the clamper 15 so that it is positioned in a machining position exactly. The laser beam 72 irradiated to the window 15a is condensed by the lenses 10 and 11 such that a cross-sectional area of the beam 72 at the position of the window is slightly larger than that of the window 15a itself. Hence, an area of the coating of the flat cable 1 which is to be removed is defined precisely by an edge of the window 15a of the clamper 15, when irradiated with the laser beam 72. Therefore, with the shape and size of the window 15a coinciding with that of the area of the flat cable 1, it is possible to remove the coating of the portion of the flat cable 1 precisely.

As mentioned previously, a TEACO$_2$ laser having a pulse width as small as 1 to 2 $\mu$sec and peak output as large as about 5 MW preferably is used as the laser oscillator 70. In such-case, the size of cross section of the laser beam 71 at an output of the laser oscillator 71 may be about 20 mm $\times$ 30 mm, and after being passed through the condenser lenses 10 and 11 may be about 4 mm $\times$ 10 mm. Therefore, it is impossible to machine an area of the flat cable 1 which is larger than the size of 4 mm $\times$ 10 mm and a problem arises when machining an area of the flat cable which exceeds the size of the cross-sectional area of the laser beam.

Figure 8A:
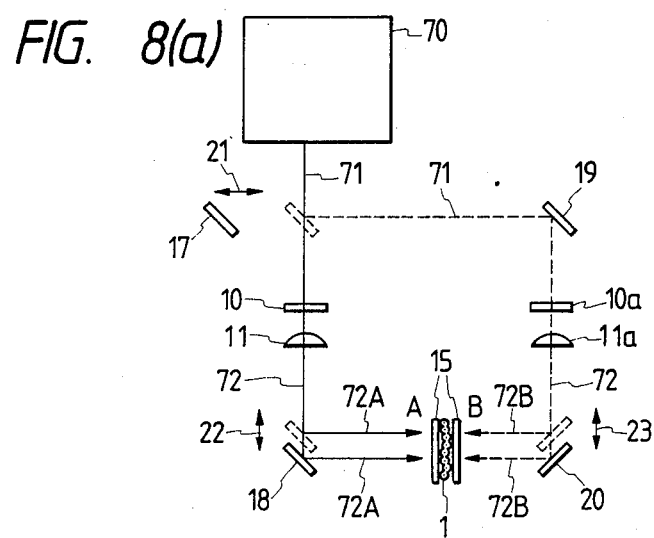
FIGS. 8a and 8b show a basic construction of another embodiment of the present invention.
Figure 8B:
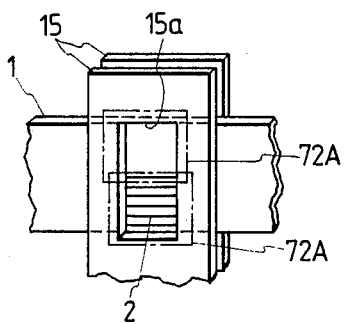

FIGS. 8a and 8b show another embodiment of the present invention by which the above-mentioned problem is solved.

The embodiment shown in FIG. 8a differs from that shown in FIG. 5a in that a bend mirror 18 is disposed on the optical axis behind the condenser lens 11 to bend the laser beam 72 at a right angle to irridiate one side A of the flat cable 1.

The bend mirror 18 is designed such that its position on the optical path in shiftable by means of a parallel shift means 22. Therefore, a laser beam 72a which is the laser beam 71 reflected by the bend mirror 18 onto the one side A of the flat cable 1 can be moved vertically in this figure as shown by imaginary line in FIG. 8b. It should be noted that a lateral size of the beam 72a has to be slightly larger than the lateral width of the window 15a for the same reason as mentioned previously.

Further, in this embodiment, it is possible to arrange another bend mirror 17 which can be inserted selectively onto the optical axis upstream of the condenser lens 10 by means of a parallel shift means 21 to guide the laser beam 71 into a second optical path composed of a bend mirror 19, condenser lenses 10a and 11a which are identical to the lenses 10 and 11, respectively. With the bend mirror 17 being inserted onto the first optical path, a laser beam 72 from the lens 11a is bent by another bend mirror 20 such that a laser beam 72b which is the laser beam 72 from the lens 11a reflected by the bend mirror 20 irradiates the other side B of the flat cable 1. The bend mirrors 17 and 20 are designed such that their positions on the respective optical paths are shiftable by means of parallel shift means 21 and 23, respectively. Therefore, the beam 72b can be moved vertically in this figure as in the case of the laser beam 72a.

According to this embodiment, a coating of any portion of the flat cable 1 can be removed with its edge being well-defined even if an area of the portion is larger than a cross sectional area of the laser beam. Further, with the second optical path, it is possible to machine the flat cable 1 from both sides thereof. Therefore, it is possible to remove a coating of the flat cable in any shape and size with a laser beam having relatively small energy, thereby minimizing a possiblity damage of even to thin conductors.

Since, according to the present invention, the shape and size of the coating area of the flat cable which is to be removed is defined by the shape and size of the window 15a of the clamper 15, it is possible to perform a coating removal of a desired portion of the flat cable such as shown in FIG. 7b, by selecting the window shape. The clamper 15 is, of course, made of any material such as stainless steel which absorbs little laser beam energy. Further, it is possible to use a cooling device for restricting a transmission of heat generated in the clamper due to laser beam to the remaining coating portion of the flat cable 1 which is not to be removed.

Further, although, in the embodiment shown in FIG. 8a, the first optical path and the second optical path are described as being used alternatively, it is possible to use them both simultaneously when a so-called beam splitter is used as the bend mirror 17. In such cases, it is possible to remove the shift means 21, and to shorten the removal operation time.

The bend mirrors 18 and 20 may be fixed. In such cases, the clamper 15 in FIG. 8a is moved vertically. Of course, the parallel shift means 22 and 23 can be omitted in such a case.

What is claimed is:

1. A method of removing insulating coating of an electric cable, comprising the step of irradiating said electric cable with a laser beam pulse having a small pulse width and a large peak output, wherein said pulse width is 1 to 2 $\mu$sec and said peak output is 15 MW.

2. A method of removing insulating coating of an electric cable, comprising the step of irradiating said electric cable with a laser beam pulse having a small pulse width and a large peak output, wherein said electric cable is a flat cable having a plurality of conductors each having an insulating coating, wherein said insulating coating is of vinyl, and wherein a diameter of each said conductor having said insulating coating is 1 mm or smaller and a diameter of said conductor is 500 $\mu$m or smaller.

3. The method as claimed in any of claims 1, or 2, wherein a removal of said insulating coating is performed in a deoxidized atmosphere.

4. An apparatus for removing an insulating coating of an electric cable, comprising:
   a laser oscillator for generating a pulse laser beam having a short pulse width and a large peak output;
   cylindrical lens means for guiding said pulse laser beam from said laser oscillator onto said electric cable; and
   means for putting said electric cable in a deoxidized atmosphere so that a removal of said insulating coating is performed in the deoxidized atmosphere.

5. An apparatus for removing an insulating coating of an electric cable comprising a laser oscillator, first condenser lens means disposed on a first optical path for condensing an output laser beam from said laser oscillator into a condensed laser beam having a rectangular cross; section and directing said condensed laser beam onto a first side of said electric cable, first lens shift means for shifting said first condenser lens means along said first optical path of said laser beam, and cable positioning means having a first window corresponding in shape and size to a predetermined area of said electric cable, said insulating coating in said predetermined area to be removed, said cable positioning means being positioned in an area of said electric cable to be irradiated with said laser beam.

6. The apparatus as claimed in claim 5, wherein said electric cable is a flat cable having at least twenty cable elements each having a diameter of 0.5 mm or less, each said cable element being composed of a core conductor having a diameter of 120 μm and an insulating coating.

7. The apparatus as claimed in claim 5, wherein said laser oscillator is a TEACO$_2$ laser oscillator.

8. The apparatus as claimed in claim 7, wherein said laser beam from said TEACO$_2$ laser oscillator is a pulse laser beam having a pulse width of 1 to 2 μsec and a peak output of 1 MW or more.

9. The apparatus as claimed in claim 5, wherein said lens means includes at least one cylindrical lens.

10. The apparatus as claimed in claim 9, wherein said means for shifting said lens means functions to regulate both sides of said rectangular cross-section of said condensed laser beams.

11. The apparatus as claimed in claim 5, wherein said cable positioning means comprises a cable clamper.

12. The apparatus as claimed in claim 11, wherein said cross-section of said condensed laser beam is slightly larger than said window.

13. The apparatus as claimed in claim 11, wherein said clamper comprises a first plate having said first window and a second plate having a second window identical to said first window, said flat cable being held between said first and said second plates.

14. The apparatus as claimed in claim 13, further comprising second condenser lens means disposed on a second optical path for condensing an output laser beam from said laser oscillator into a laser beam having a rectangular cross section and directing said laser beam onto the opposite side of said electric cable, second lens shift means for shifting said second condenser lens means along said second optical path of said laser beam and means for directing said condensed laser beam through said first and said second optical paths onto said first and second plates of said clamper.

15. The apparatus as claimed in claim 14, wherein said clamper is positioned at a right angle with respect to said first and said second optical paths, further comprising a first and a second bend mirror disposed in said first and second optical paths, respectively, to direct said condensed laser beam to said first and second windows of said clamper and said means for directing said laser beam includes second condenser lens means arranged in a second optical axis, further comprising third and fourth bend mirrors disposed in said first and said second optical paths, respectively, and means for relatively moving said mirrors to said clamper for switching between said first optical path and said second optical path to irradiate said electric cable through said first and said second windows alternatively.

16. The apparatus as claimed in claim 14, wherein said clamper is positioned at a right angle with respect to said first and said second optical paths, further comprising a first and a second bend mirror disposed in said first and second optical paths, respectively, to direct said condensed laser beam to said first and second windows of said clamper and said means for directing said laser beam includes second condenser lens means arranged in a second optical axis, further comprising a beam splitter for irradiating said electric cable through said first and said second windows simultaneously.

17. The apparatus as claimed in claim 11, wherein said clamper is made of a material whose laser absorptivity is relatively low.

18. The apparatus as claimed in claim 12, wherein said clamper is made of stainless steel.

19. The apparatus as claimed in claim 11, further comprising cooling means for cooling said clamper.

* * * * *